United States Patent
Nguyen et al.

(10) Patent No.: US 9,172,476 B2
(45) Date of Patent: Oct. 27, 2015

(54) METHOD AND SYSTEM FOR REMOVAL OF NOISE IN SIGNAL

(71) Applicant: U.S. Army Research Laboratory ATTN: RDRL-LOC-I, Adelphi, MD (US)

(72) Inventors: Lam Huy Nguyen, Laurel, MD (US); Trac D. Tran, Ellicott City, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 258 days.

(21) Appl. No.: 13/891,050

(22) Filed: May 9, 2013

(65) Prior Publication Data

US 2013/0244710 A1 Sep. 19, 2013

Related U.S. Application Data

(63) Continuation-in-part of application No. 13/477,282, filed on May 22, 2012, now Pat. No. 8,824,544, which is a continuation of application No. 13/416,062, filed on Mar. 9, 2012, now Pat. No. 8,861,588.

(51) Int. Cl.
*H04B 1/10* (2006.01)
*H04B 15/00* (2006.01)
(Continued)

(52) U.S. Cl.
CPC .............. *H04B 15/00* (2013.01); *G01S 7/023* (2013.01); *G01S 13/0209* (2013.01); *G01S 13/90* (2013.01); *H04L 27/0004* (2013.01); *H04B 1/71632* (2013.01); *H04B 17/345* (2015.01)

(58) Field of Classification Search
CPC ........... G01S 7/02; G01S 7/023; G01S 13/02; G01S 13/0209; G01S 13/88; G01S 13/89; G01S 13/90; H04B 1/69; H04B 1/7163; H04B 1/71632; H04B 15/00; H04B 17/30; H04B 17/309; H04B 17/345; H04L 27/0004

USPC ...... 342/13–21, 25 R–25 F, 89–93, 159–164, 342/175, 176, 179, 192–197; 455/39, 63.1, 455/73, 78; 375/130, 140, 147, 316, 346
See application file for complete search history.

(56) References Cited

U.S. PATENT DOCUMENTS 3,710,256 A * 1/1973 Lewis .............................. 342/15
4,573,052 A * 2/1986 Guillerot et al. ................ 342/19
(Continued)

OTHER PUBLICATIONS

Wright, J., "Robust Face Recognition via Sparse Representation," IEEE Transactions on Pattern Analysis and Marchine Intelligence, vol. 31, No. 2, p. 210, Feb. 2009.
(Continued)

*Primary Examiner* — Bernarr Gregory
(74) *Attorney, Agent, or Firm* — Lawrence E. Anderson

(57) ABSTRACT

A method and system for reception of electromagnetic waves in which interference with radio frequencies of other electronics devices occurs comprising;
at least one transmitter for transmitting electromagnetic radiation at a wide range of frequencies;
at least one receiver fix receiving the received signal comprising the first electromagnetic radiation and RF interfering signal data;
a first memory portion for storing transmitted signal waveforms;
a second memory portion for storing RF interfering signal data;
a switch for periodically allowing the RF interfering signal data to enter the second memory portion from the receiver;
the at least one processor operating to process and compare the received signal containing RE signal data and first electromagnetic radiation by matching the received signal against data relating to the transmitted signal waveforms from the first memory portion and RF interfering signal data from the second memory portion, and extract the RF interfering signal data.

17 Claims, 9 Drawing Sheets

(51) Int. Cl.
- G01S 13/02 (2006.01)
- G01S 13/90 (2006.01)
- G01S 7/02 (2006.01)
- H04L 27/00 (2006.01)
- H04B 1/00 (2006.01)
- H04B 1/7163 (2011.01)
- H04B 17/345 (2015.01)

(56) References Cited

U.S. PATENT DOCUMENTS

| | | | | |
|---|---|---|---|---|
| 4,682,172 | A * | 7/1987 | Kuhrdt | 342/15 |
| 4,689,622 | A * | 8/1987 | Kuhrdt | 342/14 |
| 4,713,662 | A * | 12/1987 | Wiegand | 342/13 |
| 4,885,587 | A * | 12/1989 | Wiegand et al. | 342/14 |
| 4,891,646 | A * | 1/1990 | Wiegand | 342/15 |
| 5,706,013 | A * | 1/1998 | Melvin et al. | 342/159 |
| 5,805,098 | A | 9/1998 | McCorkle | |
| 6,768,444 | B2 * | 7/2004 | Langsford | 342/17 |
| 6,937,676 | B2 * | 8/2005 | Takada et al. | 375/346 |
| 7,031,402 | B2 * | 4/2006 | Takada | 375/346 |
| 7,796,829 | B2 | 9/2010 | Nguyen | |
| 8,193,967 | B2 | 6/2012 | Nguyen et al. | |
| 8,320,504 | B2 * | 11/2012 | Peng et al. | 375/346 |
| 8,620,093 | B2 | 12/2013 | Nguyen et al. | |
| 8,824,544 | B2 * | 9/2014 | Nguyen et al. | 375/316 |
| 8,855,580 | B2 * | 10/2014 | Dent et al. | 455/78 |
| 8,861,588 | B2 * | 10/2014 | Nguyen et al. | 375/316 |
| 2002/0155812 | A1 * | 10/2002 | Takada | 455/63 |
| 2010/0141508 | A1 | 6/2010 | Nguyen et al. | |
| 2011/0163912 | A1 | 7/2011 | Nguyen | |
| 2012/0033713 | A1 * | 2/2012 | Yang et al. | 375/147 |
| 2012/0112957 | A1 | 5/2012 | Nguyen | |

OTHER PUBLICATIONS

Nguyen, L, et al. "Improving SAR Image of Mine-Type Targets from Restricted Radar Band Data," Proc. SPIE 5794, Detection and Remediation Technologies for Mines and Minelike Targets X, 522 (Jul. 8, 2005); doi:10.1117/12.603811.
Nguyen, L., Soumekh, M., "Improving SAR image of mine-type targets from restricted radar band data," Proceedings of SPIE vol. 5794, pp. 522-531 (2005).
M. Ressler, "The Army Research Laboratory Ultra Wide-Bandwidth Boom Synthetic Aperture Radar," May 1996, IGARSS96 Symposium Report, pp. 1886-1888.
Candes, et al. "Decoding by linear programming," IEEE Trans. on Information Theory, vol. 51, No. 12, pp. 4203-4215 (Dec. 2005).
M. A. T. Figueiredo, R. D. Nowak, and S. J. Wright, "Gradient projection for sparse reconstruction: Application to compressed sensing and other inverse problems," IEEE Journal of Selected Topics in Signal Processing: Special Issue on Convex Optimization Methods for Signal Processing, vol. 1, No. 4, pp. 586-598 (Apr. 2007)(.
J. Tropp and A. Gilbert, "Signal recovery from random measurements via orthogonal matching pursuit," IEEE Trans. on Information Theory, vol. 53, No. 12, pp. 4655-4666 (Dec. 2007).
D. Needell and R. Vershynin, "Signal recovery from incomplete and inaccurate measurements via regularized orthogonal matching pursuit," IEEE Journal of Selected Topics in Signal Processing, vol. 4, pp. 310-316 (Apr. 2010).
W. Dai and O. Milenkovic, "Subspace pursuit for compressive sensing: Closing the gap between performance and complexity," IEEE Trans. on Information Theory, vol. 55, pp. 2230-2249 (May 2009).
T. T. Do, L. Gan, N. H. Nguyen, and T. D. Tran, "Sparsity adaptive matching pursuit algorithm for practical compressed sensing," in Proc. Asilomar Conf. on Signals, Systems, and Computers, pp. 581-587, Pacific Grove (Oct. 2008).
Nguyen, L. H., Kapoor, R., Sichina, J., "Detection algorithms for ultrawideband foliage-penetration radar," Proceedings of SPIE vol. 3066, pp. 165-176 (1997).
L. Nguyen, K. Kappra, D. Wong, R. Kapoor, and J. Sichina, "Mine field detection algorithm utilizing data from an ultrawideband wide-area surveillance radar," Proc. SPIE Int. Soc. Opt. Eng. 3392, 627 (1998).
Nguyen, L., Ressler, M., Sichina, J., "Sensing through the wall imaging using the Army Research Lab ultra-wideband synchronous impulse reconstruction (UWB SIRE) radar," Proceedings of SPIE vol. 6947, 69470B (2008).
Lam Nguyen, Trac Tran, "Robust Recovery of Synthetic Aperture Radar Data from Uniformly Under-Sampled Measurements," IEEE IGARSS, 2011.
John McCorkle and Lam Nguyen, "Focusing of Dispersive Targets Using Synthetic Aperture Radar," Army Research Laboratory Report, ARL-TR-305, Aug. 1994.
S. G. Mallat and Z. Zhang, "Matching pursuits with time-frequency dictionaries." IEEE Transactions on Signal Processing, vol. 41, No. 12, pp. 3397-3415, 1993.
R. Tibshirani, "Regression shrinkage and selection via the lasso," Journal of the Royal Statistical Society. Series B (Methodological), pp. 267-288, 1996.
D. L. Donoho and M. Elad, "Optimally sparse representation in general (nonorthogonal) dictionaries via $\ell 1$ minimization," Proceedings of the National Academy of Sciences 100.5, pp. 2197-2202, 2003.
Real-Time Versus Equivalent-Time SamplingTektronix Application Note, http://www2.tek.com/cmswpt/tidetails.lotr?ct=TI&cs=Application+Note&ci=14295&lc=EN. Jan. 1, 2001.
Lam Nguyen, "Signal and Image Processing Algorithms for the U.S Army Research Laboratory Ultra-wideband (UWB) Synchronous Impulse Reconstruction (SIRE) Radar," Army Research Laboratory Technical Report, ARL-TR-4784, Apr. 2009.
Nguyen, L. H.; Ton, T. T.; Wong, D. C.; Ressler, M. A. "Signal Processing Techniques for Forward Imaging Using Ultrawideband Synthetic Aperture Radar," Proceedings of SPIE 5083, 505, (2003).
Thong T. Do, Trac D. Tran and Lu Gan, "Fast compressive sampling using structurally random matrices", Proc. of ICASSP 2008, Las Vegas, Apr. 2008.
Ressler, Marc, et al., "The Army Research Laboratory (ARL) Synchronous Impulse Reconstruction (SIRE} Forward-Looking Radar," Proceedings of SPIE, Unmanned Systems Technology IX, vol. 6561. May 2007.
T. Miller, L. Potter, and J. McCorkle, "RFI Suppression for Ultra Wideband Radar," IEEE Transactions on Aerospace and Electronic Systems, vol. 33, No. 4, Oct. 1997.
M. Ressler et al., "The Army Research Laboratory Ultra-Wideband Testbed Radars," IEEE 1995 International Radar Conference, Alexandria, Va., May 1995.
John W. McCorkle, "Focusing of Synthetic Aperture Ultra Wideband Data," IEEE Int'l Conf on Systems Engineering, Aug. 1992, p. 1-5.
Nguyen, L. "Signal Processing Technique to Remove Signature Distortion in a ARL Synchronous Impulse Reconstruction (SIRE) Ultra-Wideband (UWB) Radar," ARL-TR-4404; U.S. Army Research Laboratory: Adelphi, MD, Mar. 2008.
S. Becker, et al., "NESTA: a Fast and Accurate First-order Method for Sparse Recovery," SIAM J. on Imaging Sciences, 4, 1-39 (2011).
E. J. Candès and M. Wakin, "An introduction to compressive sampling," IEEE Signal Processing Magazine, vol. 25, No. 2, pp. 21-30, Mar. 2008.
Nguyen, L., "Image Resolution Computation for Ultra-Wideband (UWB) Synchronous Impulse Reconstruction (SIRE) Radar" Army Research Laboratory Technical Report ARL-TN-294, Army Research Laboratory Adelphi, MD 20783-1197, Sep. 2007.
Nguyen, L.; Wong, D.; Ressler, M.; Koenig, F.; Stanton, B.; Smith, G.; Sichina, J.; Kappra, K. "Obstacle Avoidance and Concealed Target Detection Using the Army Research Lab Ultra-Wideband Synchronous Impulse Reconstruction (UWB SIRE) Forward Imaging Radar," Proceedings of SPIE, Detection and Remediation Technologies for Mines and Minelike Targets XII, vol. 6553, Apr. 2007.
Nguyen, L.; Soumekh, M. "Suppression of Radio Frequency Interference (RFI) for Equivalent Time-sampling Ultra-wideband Radar," Proceedings of SPIE, Algorithms for Synthetic Aperture Radar Imagery XII, 2005.

(56) References Cited

OTHER PUBLICATIONS

Nguyen, L.; Soumekh, M. "System Trade Analysis for an Ultra-wideband Forward Imaging Radar," Proceedings of SPIE, Unmanned Systems Technology VIII, vol. 6230, 2006.

Nguyen, L. H.; Ton, T.; Wong, D.; Soumekh, M. "Adaptive Coherent Suppression of Multiple Wide-bandwidth RFI Sources in SAR," Proceedings of SPIE Int. Soc. Opt. Eng. vol. 5427, 1, 2004.

Lam Nguyen, Thong Do, Trac Tran, "Sparse Model and Sparse Recovery with Ultra-wideband SAR Applications," 1st International Workshop on Compressed Sensing Applied to Radar, May 2012.

Nguyan, L, and Do, T., "Recovery of Missing Spectral Information in Ultra-Wideband Synthetic Aperture Radar (SAR) Data," IEEE Radar Conference (RADAR), (2012) IEEE pp. 0253-0256. Digital Object Identifier: 10.1109/RADAR.2012.6212146 Date of Conference: May 7-11, 2012.

\* cited by examiner

METHOD AND SYSTEM FOR REMOVAL OF NOISE IN SIGNAL

CROSS REFERENCE TO RELATED APPLICATIONS

This application is a continuation-in-part of and claims priority to U.S. patent application Ser. No. 13/477,282, now U.S. Pat. No. 8,824,544, entitled "Method and System for Recovery of Missing Spectral Information in Wideband Signal" by Lam H. Nguyen and Thong Do filed May 22, 2012, which is a continuation-in-part and claims priority to U.S. patent application Ser. No. 13/416,062, now U.S. Pat. No. 8,861,588, entitled "Apparatus and Method for Sampling and Reconstruction of Wide Bandwidth Signals below Nyquist Rate," by Lam H. Nguyen and Trac Tran filed Mar. 9, 2012; both of which are hereby incorporated by reference.

STATEMENT OF GOVERNMENT INTEREST

The embodiments herein may be manufactured, used, and/or licensed by or for the United States Government without the payment of royalties thereon.

BACKGROUND OF THE INVENTION

The present invention relates to, inter alia, noise extraction from a signal. The signal may be used, for example, in the generation of images from projection measurements. Examples of images generated from projection measurements include two-dimensional and three-dimensional SAR (synthetic aperture radar) systems. SAR is a form of radar in which the large, highly-directional rotating antenna used by conventional radar is replaced with many low-directivity small stationary antennas scattered over some area near or around the target area. For example, as shown in FIG. 1 of U.S. Pat. No. 5,805,098 to McCorkle, hereby incorporated by reference, an aircraft mounted detector array is utilized to take ground radar measurements. Other examples of systems using projection measurements are fault inspection systems using acoustic imaging, submarine sonar for imaging underwater objects, seismic imaging system for tunnel detection, oil exploration, geological surveys, etc., and medical diagnostic tools such as sonograms, echocardiograms, x-ray CAT (computer-aided tomography) equipment and MRI (magnetic resonance imaging) equipment.

Wide-bandwidth signals are widely used in communications and radar systems. Over the past few decades, the research and development of ultra-wideband (UWB) systems have achieved significant progress. One of the key features of these UWB systems is the penetration capability. For example, the U.S. Army has been developing UWB radar systems for detection of difficult targets in various applications such as foliage penetration, ground penetration, and sensing through the walls of buildings or barriers (sensing-through-the-wall). Therefore, these systems must operate in the low-frequency spectrum that spans from under 100 MHz to several GHz in order to achieve the penetration capability. In addition to the low-frequency requirement for penetration, the systems must employ wide-bandwidth signals to achieve the desired resolution. Thus, the signal occupies a wide spectrum that also shared by radio, TV, cellular phone, and other systems. For example, radio waves in general usage have wavelengths ranging from hundreds of meters to about one millimeter and are used for transmission of data, via, modulation. Television, mobile phones, wireless networking, and amateur radio all use radio waves. The use of the radio spectrum is regulated by many governments through frequency allocation.

The frequency allocation and utilization problem becomes a big challenge and only gets worse over time since additional radar and communication systems that need the penetration feature must operate in this low-frequency region of the spectrum. The FCC and international treaties in general restrict the hands between 5 and 30 MHz, since they are particularly useful for long-distance communications.

There are at least two challenges for any UWB system (radar or communications). The first is that the system must operate in the presence of other systems. The received UWB signal through the channel is contaminated by signals from all systems that operate in the same spectrum. Because of this, the received signal would have a spectral content that includes many frequency subbands that are corrupted by energy from all other sources. Within these corrupted subbands, the energy of the received signal is much smaller than that from the interference sources. In the time domain, the signal is very noisy and might be embedded in the noise floor. Except for targets with very large amplitudes, most targets may not be detectable in the presence of interference noise. Conventional techniques usually detect the corrupted frequency bands (due to the interference sources) by searching for the spikes in the spectral domain. The fast Fourier transform (FFT) bins that correspond to the contaminated frequency bands are zeroed out. This technique results in severe sidelobes in the time or spatial domain of the output data and imagery due to the sharp transitions (frequency samples with no information) in the frequency domain. In addition, simply suppressing the information in the contaminated frequency bands will reduce the signal-to-noise ratio (SNR) of the received signal.

Interference signals from competing frequencies are essentially large amplitude noise that often masks the underlying radar signals. Various interference noise suppression techniques have been proposed to date. The simplest approach that has been widely employed in practice involves implementing adaptive notch filters (whose notches in the frequency domain correspond to interference noise components) to suppress the energy from interference noise signals. Depending on the nature of the interference noise sources, this notch-filter approach would result in (i) large sidelobes in the time domain of the received signal and (ii) reduced target amplitudes. It is generally desirable to extract the interference noise from signal in time domain for best performance. To avoid, the side effects of the notch-filter implementation. Miller et al., "RFI Suppression for Ultra Wideband Radar," *IEEE Transactions on Aerospace and Electronic Systems*, vol. 33, no. 4, (October 1997) (herein incorporated by reference) proposes another interference noise suppression technique that estimates the noise components and subtracts (in the time domain) the estimated noise signal from the received radar signal. However, the technique requires complete knowledge of the interference sources. The technique is based on the assumption that the interference sources consist of a number of narrowband amplitude modulation (AM) and frequency modulation (FM) channels. This assumption is no longer valid with the current frequency spectrum, in which most of the communications and TV channels are broadcasting using various digital modulation schemes. Within each communications channel, the radio frequency (RF) signal looks like white noise in the time domain with its amplitude and phase quickly varying with respect to time. Thus, it is not possible to use the Miller technique to estimate these RF interference (RFI) components with digital modulation contents.

Another challenge for any UWB system (radar or communications) is that the system must avoid transmitting energy in certain frequency bands that are specified by the frequency management agencies. Thus, the received UWB signal would have a spectral content that is not contiguous (due to spectral notches that correspond to the prohibited frequency bands). The notches in the frequency domain translate to severe noise and artifacts in the resulting data and imagery. Depending on the size of the spectral notches, state-of-the-art systems might have to process each contiguous band separately to get results from multiple bands. Since the results from multiple bands are interpreted independently, this creates another challenge for the detection and discrimination stages.

SUMMARY OF THE INVENTION

A preferred embodiment of the present invention is directed to a technique that directly estimates the interference noise components in the time domain and extracts them from radar data. An advantage of this technique is that the time-domain extraction of RFI noise does not result in (i) large sidelobes in the time domain of the received signal and (ii) reduced target amplitudes. The second advantage is that it is completely adaptive with the changing environment and does not assume any knowledge (amplitude, frequency band, modulation scheme, etc.) of the sources of interference. The invented technique simultaneously estimates (i) the signal embedded in interference noise (which may be, for example, a radar signal) with large amplitudes and (ii) the interference noise signal.

A preferred embodiment system for reception of electromagnetic waves in spectrum in which interference with radio frequencies of other electronics devices occurs comprises at least one transmitter far transmitting first electromagnetic radiation at a wide range of frequencies, including frequencies in which RF devices transmit, at least one receiver for receiving the received signal comprising the first electromagnetic radiation and radio frequency interfering signal data; a first memory portion for storing data relating to the transmitted signal waveforms; and a second memory portion for storing radio frequency interfering signal data; a switch for periodically allowing the radio frequency interfering signal data to enter the second memory portion from the receiver; the at least one processor operatively connected to the receiver, the first memory portion and the second memory portion, the at least one processor operating to process the received signal containing radio frequency interfering signal data and first electromagnetic radiation by matching the received signal against data relating to the transmitted signal waveforms from the first memory portion and radio frequency interfering signal data from the second memory portion, the at least processor operating to compare the received signal to the radio frequency interfering signal data from the second memory portion and extract the portion of the received signal attributable to the radio frequency interfering signal data.

Optionally, the first and second memory portions comprise first and second dictionaries and the switch for periodically allowing the radio frequency interfering signal data to enter the second dictionary comprises software which incrementally sends the radio frequency interfering signal data into the second dictionary while the transmitter is not transmitting. As an optional alternative, the switch may be a hardware switch that incrementally sends the radio frequency interfering signal data into the second memory portion while the transmitter is not transmitting.

Optionally, the first memory portion may be constructed using time independent transmitted signal waveforms which correspond to received signals reflected back from objects in the scene of interest located at specific distances, and the processor may be operated to match the receive data with a stored transmitted signal waveforms to determine the distance of the target or targets.

Optionally, the second memory portion comprises radio frequency interfering signal data received at intervals in time during which no signal is transmitted; the radio frequency interfering signal data being broken into segments using a sliding window mechanism to store different segments into different columns of the second memory portion, the at least one processor operating to compare the received signals to the match the received signals with the best matches from each of the first and second dictionaries.

Optionally, a combined memory is formed from the first and second memory portions, and the at least one processor correlates the received signal to the entries in the combined memory to find the best matching columns and to select those columns associated with second memory portion to estimate the radio frequency interfering signal data in the received signal, and to extract the estimated radio frequency interfering signal data from the received signal to generate an improved radar signal.

Optionally, the first and second memory portions may take the form of first and second dictionaries having the same number of columns. Optionally, each column in the first memory portion comprises a vector that has a length n elements arranged in a column that corresponds to the range swath of the radar and the columns range in time and distance such that each column represents a target at a different distance.

Optionally, the $L_1$ norm is used to find the best matching columns in the combined memory using the equation $$\{\alpha'_i, e'_i\} = \operatorname*{argmin}_{\alpha_i, e_i} \left\| y_i - D_i^x \alpha_i - D_i^{rfi} e_i \right\|_2 + \lambda \|\alpha_i\|_1 + \tau \|e_i\|_1.$$

where y is the sparse signal, r is the radio frequency interfering signal data, $w_i$ is a dense noise source and generally insignificant in magnitude, $e_i$ is the sparse noise source and can be captured with only a few significant entries, but each can be large in magnitude, a represents the coefficients of the indices of signal data $D_i^x$ represents the first dictionary and $D_i^{rfi}$ represents the second dictionary, $\lambda$ and $\tau$ represent constants.

Optionally, as an alternative. $L_0$ norm can be used to find the best matching columns in the combined memory portion using the equation $$\{\alpha'_i, e'_i\} = \operatorname*{argmin}_{\alpha_i, e_i} \{\|\alpha_i\|_0 + \|e_i\|_0\}$$

$$\text{s.t.} \quad y_i = [\, D_i^x \quad D_i^{rfi}\,] \begin{bmatrix} \alpha_i \\ e_i \end{bmatrix} + w_i$$

where y is the sparse signal, $w_i$ is a dense noise source and generally insignificant in magnitude, $e_i$ is the sparse noise source, $\alpha_i$ represents the coefficients of the indices of signal data, $D_i^x$ represents the first memory portion and $D_i^{rfi}$ represents the second memory portion.

Optionally, each column in the second memory portion represents the radio frequency interfering signal data and the columns in the first and second memory portions have same dimensions. The columns of data in the second memory portion may correlate to radio frequency interfering signal data shifted in time and, by taking the L0 norm, the received signal is matched with radio frequency interfering signal data shifted in time. As a further option, the radio frequency interfering signal data may be subtracted out by performing $L_1$ norm.

Optionally, the signal data may be represented by $y_i = x_i + r_i + w_i = D_i^x \alpha_i + D_i^{rfi} e_i + w_i$, where were y is the sparse signal, $r_i$ is the radio frequency interfering signal data $w_i$ is a dense noise source and generally insignificant in magnitude, $e_i$ is the sparse noise source and can be captured with only a few significant entries, but each can be large in magnitude, $\alpha_i$ represents the coefficients of the indices of signal data, $D_i^x$ represents the first memory portion and $D_i^{rfi}$ represents the second memory portion.

As further options, the composite image may be formed using one of orthogonal matching pursuit, basis pursuit, gradient projection, matching pursuit, orthogonal matching pursuit, regularized matching pursuit or subspace pursuit.

A preferred method for reception of electromagnetic waves in spectrum in which interference with radio frequencies of other electronics devices occurs comprises
transmitting, first electromagnetic radiation unto a target area at a wide range of frequencies,
using a receiver, receiving the received signal comprising the transmitted first electromagnetic radiation and radio frequency interfering signal data;
providing a first memory portion for storing data relating to the transmitted signal waveforms;
providing a second memory portion for storing radio frequency interfering signal data;
providing a switch for periodically allowing the radio frequency interfering signal data to enter the second memory portion from the receiver;
providing at least one processor operatively connected to the receiver, the first memory portion and the second memory portion,
using the at least one processor, processing the received signal from the target area containing radio frequency interfering signal data and target image data by matching the received signal against data relating to the transmitted signal waveforms from the first memory portion and radio frequency interfering signal data from the second memory portion,
using the at least processor, comparing the received signal to the radio frequency interfering signal data from the second memory portion and extracting the portion of the received signal attributable to the radio frequency interfering signal data to obtain the transmitted first electromagnetic radiation.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of imitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5 includes the frequency ranges in which FM, digital TV and cellular phones operate.

FIG. 6 shows the root mean square of the signal versus the RFI suppression performance in decibels.

DETAILED DESCRIPTION OF PREFERRED EMBODIMENTS

Figure 1:
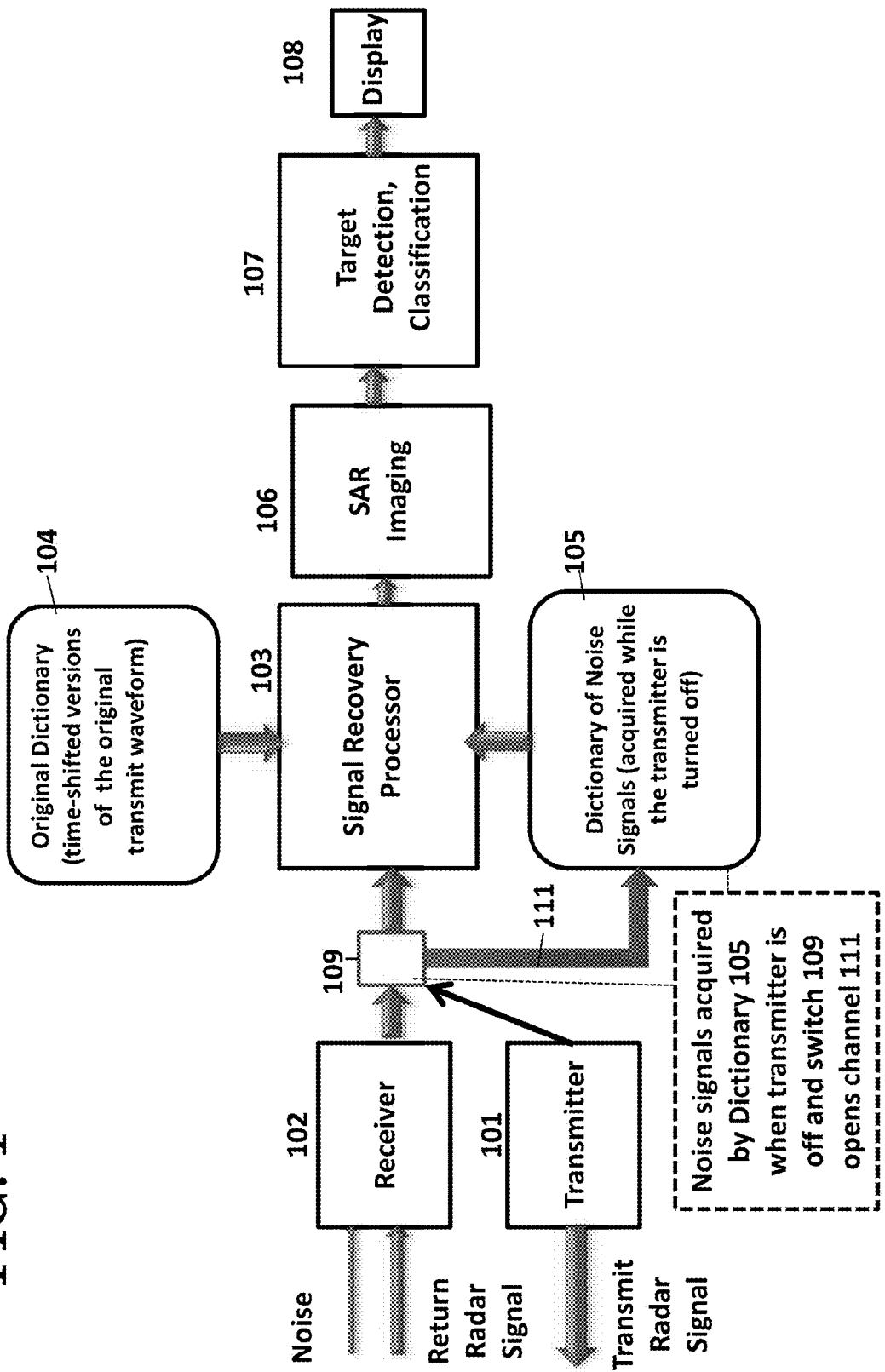
FIG. 1 is a schematic block diagram of a preferred embodiment of the present invention.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The terminology used herein is for the purpose of describing particular embodiments only and is not intended to limit the fall scope of the invention. As used herein, the singular forms "a", "an" and "the" intended to include the plural thrills as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. For example, when referring first and second photons in a photon pair, these terms are only used to distinguish one element, component, region, layer or section from another region, layer or section. Thus, a first element, component, region, layer or section discussed below could be termed a second element, component, region, layer or section without departing from the teachings of the present invention.

Unless otherwise defined, all terms (including technical and scientific terms) used herein have the same meaning as commonly understood by one of ordinary skill, in the art to which this invention belongs, it will be further understood that terms, such as those defined in commonly used dictionaries, should be interpreted as having a meaning that is consistent with their meaning in the context of the relevant art and will not be interpreted in an idealized or overly formal sense unless expressly so defined herein.

A preferred embodiment of the present invention comprises a sparse-recovery model and reconstruction scheme. The invention allows the reconstruction of a wideband signal that has missing frequency bands.

Although the invention is demonstrated with the application of this technique to radar applications, the sampling and reconstruction technique of the present invention also works with other communication systems, including television reception and transmission, headphones with noise filters, and other communications devices; especially ones that employ ultra high frequency modulation schemes.

A preferred embodiment of the present invention comprises a sparsity-driven spectral recovery (SSR) technique that coherently estimates the spectral information in the frequency bands of the received data that may be either completely corrupted (due to the presence of interference sources) or nonexistent (because of no transmission in the prohibited frequency bands). A key innovative concept of the invention is that although the information is lost in the received signal due to the contaminated and missing frequency bands, the signal can be modeled as a linear combination of spectrally filtered and time-shifted versions of the transmitted waveform. Thus, by constructing a dictionary that comprises spectrally filtered and time-shifted versions of the transmit waveform, the technique solves for a sparse solution of the coefficients that represent the significant components contributing to the received signal. The reconstruction using the preferred embodiment sparsity-driven spectral recovery SSR technique on spectrally corrupted and spectrally notched data is well matched with the original data, while conventional techniques only attempt to reduce the resulting artifacts rather than recover the original information.

An advantage of the preferred embodiment technique is that it not only suppresses noise and artifacts from noisy and frequency notched signals, such as UWB data, it also recovers the original complex data (both amplitude and phase). Although the amplitude information is important for the first stage of signal (or target) detection, using this technique the target signature is preserved in the complex data that includes the phase content, which is the key for target discrimination and classification, and coherent change detection.

Another advantage of this technique is that because the contiguous (no abrupt changes) spectral content is recovered, this technique can achieve better performance with higher SNR in the suppression of the artifacts in the resulting data and imagery than other techniques that only attempt to reduce the noise and artifacts. In addition, since the resulting data comprises one single substantially contiguous frequency hand instead of multiple non-contiguous subbands, subsequent processing (image formation, target detection and discrimination. etc.) steps are simple because they do not have to perform on multiple data sets. In addition, more information (wideband without gaps) would translate to better performance.

A third advantage of this technique is that it can also be employed to extrapolate the spectral information outside the included band. Thus, the technique effectively increases the bandwidth and improves the resolution of the signal. This will result in better performance in the detection and discrimination of targets.

Although a preferred embodiment of the invention discloses application of this technique for radar applications only, it is within the skill of the art to use the spectral recovery techniques of the present invention apply to such applications as communications systems, including UWB communication systems.

In accordance with the principles of the present invention, the influence of noise signals is effectively removed from radar signals via sparse recovery. The preferred embodiment technique estimates and subtracts noise signals from the contaminated radar signals in the time domain. Therefore, it does not suffer from high sidelobe and reduced target-amplitude effects as in existing notch-filtering approaches. Additionally, the technique is completely adaptive with the changing environment and does net assume any knowledge (amplitude, frequency band, modulation scheme, how many interference sources are present, etc.) of the interference sources. The preferred embodiment technique is based on a sparse recovery approach that simultaneously solves for (i) radar signals embedded in noise with large amplitudes and (ii) interference noise signals.

Figure 2:
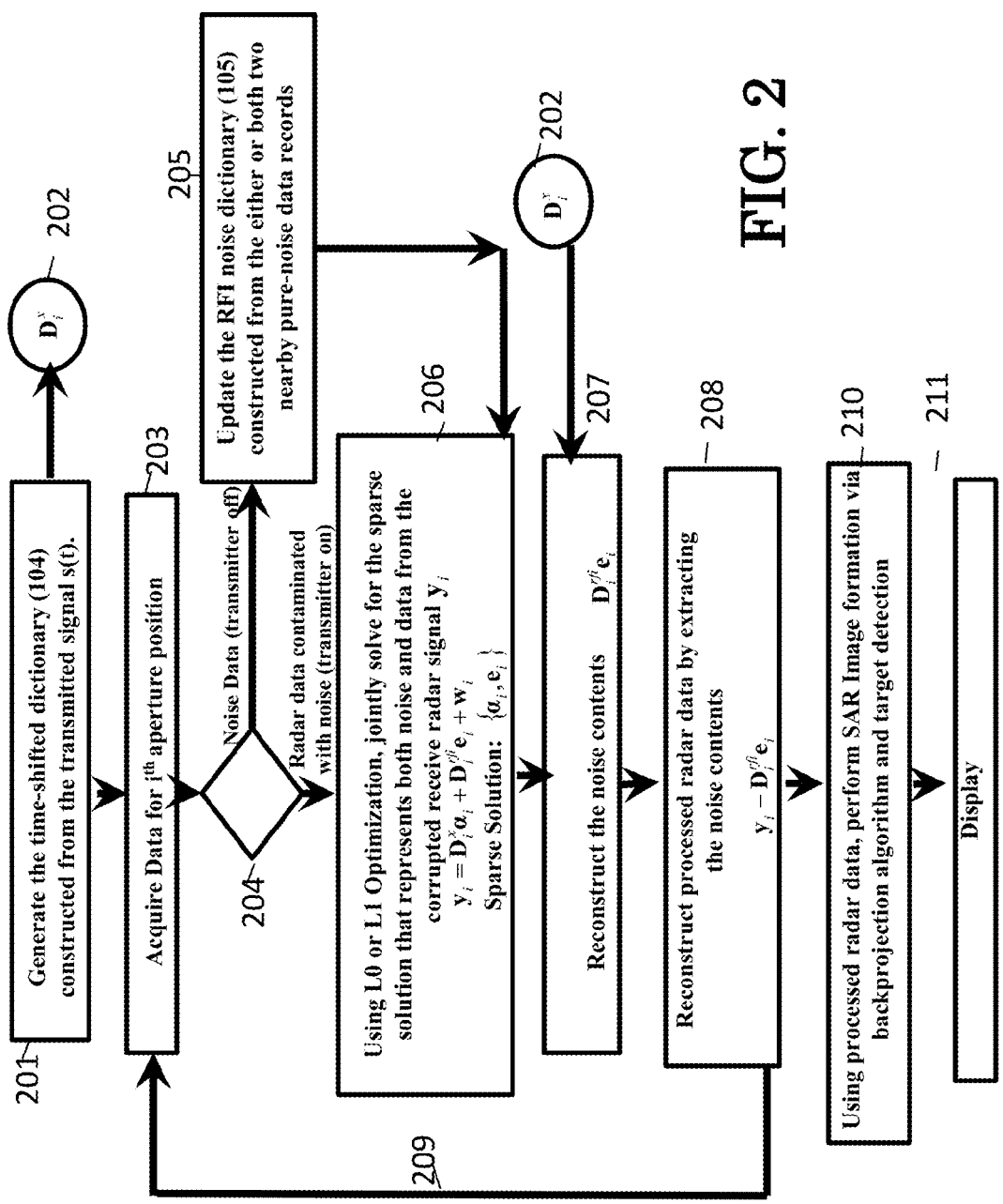
FIG. 2 is a flow chart of a preferred method of the present invention.

FIG. 1 illustrates overall schematic system block diagram of a preferred embodiment. At each pulse repetition interval (PRI), the radar transmitter (101) transmits radar signals to the area of interest and receives return radar signals that correspond to the physical objects from the area. The transmitter 101 transmits an ultra wide band signal (UWB), however, the use of the preferred embodiment is not limited to UWB signals. The receiver (102) receives the return radar signals, or backscattered pulses that are reflected from objects in the scene. The backscattered pulses are generally contaminated by interference sources (radio, TV, cellular phone, etc.). Thus, the receiver 102 receives the signal with a spectral content which 1) lacks the "notched" content from non-transmission frequency bands, and 2) has the corrupted frequency bands due to interference sources. A preferred embodiment of the present invention essentially extracts or "subtracts out" the noise. At regular intervals {k|k mod L=0}, the transmitter is turned off so that the receiver only collects pure interference noise signal. This data collection scheme is illustrated in FIG. 2. In order to determine the background noise, the preferred embodiment system incorporates noise-only intervals that occur when the transmitter 101 is turned off and the data switch 109 sends the noise signals to the memory buffer in which dictionary 105 resides via channel 111 to construct a "noise" dictionary.

During the standard radar transmit and receive cycle a pulse repetition frequency (PRF) is established where the signal is first transmitted by the transmitter. Depending upon the range or distance in which targets are to be detected, the receiver waits a time interval $t=2R/c$ where R is the range and c is the speed of flight. During the operation of the preferred embodiment however, after a certain number of PRF cycles, transmission is stopped and the noise is observed whereupon the data switch 109 is programmed to allow noise data to enter the dictionary 105. Noise data is preferably entered into the dictionary 105 using a shifted window mechanism or approach. That is, data for the first column of the dictionary 105 is entered from the noise signal (i.e., the return signal occurring when no transmission from the transmitter 101 is taking place). To enter the second column, the window is effectively shifted a minute amount via the sliding window, and the second column is data realized from the shifted interval of the noise signal. Similarly, columns of noise data are entered into the dictionary 105 during the time interval when the switch 109 diverts the data from the signal recovery processor 103 into the dictionary 105. Noise data using the sliding window approach may be entered by an additional processor or processor or such operations may be performed by the signal recovery processor. Note further that the switch 109 may be embedded or realized in software or may comprise a demultiplexer configuration, in a manner known to those skilled in the art. Moreover, the channel 111 needs not connect through the switch 109 but instead may be connected to the receiver 102. Moreover, receiver 102 may comprise a plurality of receivers, one of which is tasked with capturing noise from the received signal.

The noise in the return signal is detected during the intervals during which the transmitter does not transmit. Hence, there is no signal component present in the return signal in this case. It is noted that the signal may be transmitted and received in a matter of nanoseconds Thus the interval between the PRF cycles and the reception of the noise only signal for the purposes of entering data into the dictionary 105 may occur within a matter of nanoseconds or tens of nanoseconds. The channel 111 may include a change detector to detect changes or fluctuations in the noise such that when the noise signal changes or fluctuates substantially, the interval during which noise data is captured is more frequent. Likewise, if the noise does not change rapidly and remains relatively constant, then the interval between entering the noise data into the dictionary 105 is greater, allowing more time to be devoted to the standard PRF cycles of transmitting and receiving the wide-band signals.

At other intervals when the transmitter are turned on, the data switch 109 allows the received signals that include noisy radar signals to pass to the signal recovery processor 103 for processing.

In addition to the noise dictionary 105, the signal recovery processor 103 uses dictionary 104 that includes many time-shifted versions of the transmitted waveform. The upper or first dictionary 104 includes the time shifted versions of the original transmit waveform. This data may be stored in column beginning with data at the beginning of the range of interest. For example, if the range of interest is between 1000 meters to 5000 meters, the first column of data in the dictionary 104 may be a pulse representing, the appearance of a target at 1000 meters. The second column of data may then represent a pulse returned from a target at a short increment of distance from 1000 meters, the increment depending upon the number of column entries of data and the range of interest.

The signal recovery processor 103 utilizes the noise dictionary 105 to estimate and extract the noise signal components from the noisy receive signals to generate clean radar signals. Specifically, the lower or second dictionary 105 includes the column of noise data which are to be extracted out of the processed, signal in combination with the processing of the time-shifted versions of the transmitted waveform included in dictionary 104. The output of the signal recovery processor 103 is the receive signal with contiguous spectral content. In a typical communications system, the output signals from the signal recovery processor 103 may be processed by a detector (not shown in FIG. 1). In radar block diagram of FIG. 1, the output signals from the signal recovery processor 103 are sent to the image processor (106), and subsequently, to the target detection and discrimination (107). The resulting synthetic aperture radar (SAR) image and detection information are then visualized by the display (108). A further description of the image formation is found in U.S. Patent Application No. 2010/0141508 entitled "Method and System For Forming an Image with Enhanced Contrast and/or Reduced Noise, by Lam H. Nguyen and Jeffrey Sichina, published Jun. 10, 2010, herein incorporated by reference.

Referring now to the dictionary 104, this dictionary is constructed from time-shifted versions of the transmit signal s(t). In the absence of any spectral notches and interference sources, the received signal y(t) would be simply the summation of reflections of all targets within the radar's range swath and beamwidth, i.e., ideally the received signal would be composed of a linear combination of delayed and weighted replicas of the transmitted pulse s(t) as follows:

$$y(t) = \sum_{i=1}^{M} \alpha_i s(t - \tau_i), \quad (1)$$

where the weighting coefficients $\alpha_i$ represent the target amplitudes and the time-shifting parameters $\tau_i$ model the phase change that corresponds to the delay time it takes the transmit signal pulse s(t) to travel the distance between the transmitter/receiver and the point target of interest. In other words, the received signal may comprise the output of a linear time invariant (LTI) system modeled by the reflection coefficients and its sparsity is directly related to the complexity level of the scene. With the addition of the RFI noise $r_i(t)$ and the system noise $w_i(t)$, the complete signal model is shown in the top of FIG. 9.

It is important to note that although the observed scene might be complex with many objects, the complexity M of the receive data record is significantly reduced since the reflections from all targets that have the same range distance from the radar transmitter/receiver would be represented by a single reflection coefficient and phase. The publication by Lam Nguyen and Trac Tran, "Robust Recovery of Synthetic Aperture Radar Data from Uniformly Under-Sampled Measurements," IEEE IGARSS, (Jun. 28, 2011) (hereby incorporated by reference), describes how the model can robustly represent real SAR data, and is herein incorporated by reference.

Figure 9:
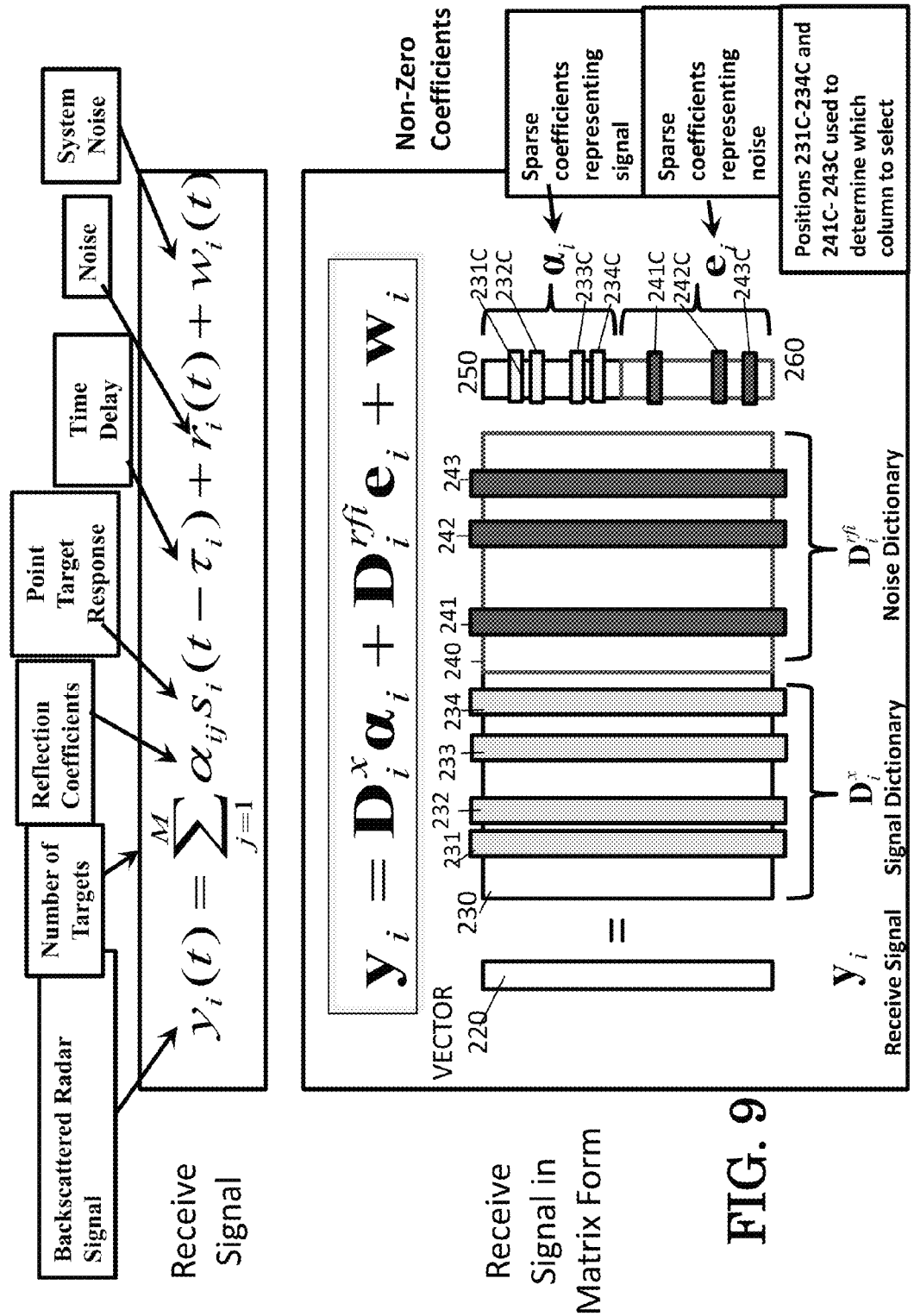
FIG. 9 illustrates conceptually the joint sparse optimization processor involving the signal dictionary $D_i^x$, with a finite number of significant coefficients in $\alpha_i$, which corresponds to the significant targets or objects within the observed scene, and the RFI noise dictionary $D_i^{rfi}$ with a finite number of significant coefficients in $e_i$, which corresponds to the significant RFI noise components present in $y_i$, the received signal at aperture index i.

FIG. 9 illustrates the received signal in digital format 220, the signal dictionary 104, the RFI noise dictionary 105, and the sparse coefficient vector memory portion 250. The signal dictionary 104 of FIG. 9 is the same as the dictionary 104 of FIG. 1 in U.S. application Ser. No. 13/477,282. The columns 231, 232, 233, 234 are selected by the nonzero entries in the solution $\alpha_i$, in the top part of vector memory portion 250. Vector memory portion 250 contains two sections; one selection is the sparse coefficients 231C, 232C, 233C, 234C of the solution and the other portion is the RFI noise coefficients $e_i$ represented by 241C, 242C, 243C, which will determine the location of the nonzero entries in noise dictionary 105. The sparse coefficients 231C, 232C, 233C, and 234C are associated with the columns 231, 232, 233, 234 and the RFI noise coefficients 241C, 242C, 243C are associated with the columns 241, 242, 243. The vector coefficients in vector memory portion 250, which includes both $\alpha_i$ and $e_i$, is obtained from the $L_0$ norm or $L_1$ norm minimization.

As shown in FIG. 9, the sparse-signal sparse-noise model for the received radar data record $y_i$ (where i can be considered as the PRI index) may be represented as:

$$y_i = x_i + r_i + w_i = D_i^x \alpha_i + D_i^{rfi} e_i + w_i \quad (5)$$

Using this model, the original SAR signal $x_i$ is assumed to be sparse with respect to $D_i^x$—the time-shifted dictionary in Box 104 of FIG. 9 constructed from our transmitted signal s(t). With the data collection strategy as illustrated in FIG. 2 and using the assumption that the interference noise signal $r_i$ is relatively stationary within a small temporal window, the interference noise signal $r_i$ also has its own sparse representation: $r_i = D_i^{rfi} e_i$, where $D_i^{rfi}$ is the time-adaptive RFI noise sparsifying, dictionary (Box 105) constructed from the either or both nearby pure-noise data records: $y_p$ (past) and/or $y_f$ (future). More specifically, if $y_{p,n}$ and $y_{f,n}$ represents the N-point noise sequences collected at time n from data record p and f, respectively, $y_{p,n}$ and $y_{f,n}$ can be represented as two column vectors as follows $$y_{p,n} = [y_p[n] y_p[n+1] y_p[n+2] \ldots y_p[n+N-1]]^T \quad (6,6A)$$

$$y_{f,n} = [y_f[n] y_f[n+1] y_f[n+2] \ldots y_f[n+N-1]]^T$$

Next, the noise dictionary (105) can be constructed from a collection of such vectors at various times n ranging from 0 to N−1 as shown in the matrix below $$D_i^{rfi} = [y_{p,0} y_{p,1} \ldots y_{p,N-1} | y_{f,0} y_{f,1} \ldots y_{f,N-1}] \quad (7)$$

In other words, columns of the noise dictionary 105 as represented in equation (7) are N-point noise segments of different phase shifts extracted directly from $y_p$ (past) and $y_f$ (future or anticipated) via a sliding window mechanism (moving a window of size N to various different locations in the RFI data record to extract various RFI noise dictionary atoms). Note that more entries can be added to the dictionary since a few past noise records can be exploited rather than just a single noise record $y_p$. In fact, a sophisticated learning dictionary can be considered to further improve the dictionary and hence the resulting sparse representation. The trade-off is generally in the computational complexity of the learning (or loading data into dictionary 105) as well as the recovery algorithm. In practice, construction of a dictionary 105 using equation (7) is efficient and little performance can be gained from venturing far away temporally.

Referring now to FIG. 2, a flow diagram of the methodology of a preferred embodiment is set forth. In Box 201, a time-shifted dictionary 104 is generated. This may occur on a one time basis at the start of operations or may be updated as desired to reflect changes in the target area or target range. The circle 202 represents the step of inputting the time-shifted data into the dictionary 104. In Box 203 the receiver is operational to receive either waveforms reflected from targets (in combination with noise) or, when the transmitter 101 is shut off during certain predetermined intervals, noise signal data. Diamond 204 reflects the operation of switch 109 by which the noise data is directed into the RFI noise dictionary 105, as described above. Box 205 represents the input of the noise data into the dictionary 105. Continuing in the flow chart of FIG. 2, in Box 206, using the data from both dictionaries 104 and 105, the system solves for the sparse solution that represents both noise and data as represented mathematically by equation (5).

Continuing in the description of the flow chart of FIG. 2, in Box 207, the noise contents of the inputted signal $y_i$ is estimated as $r_i = D_i^{rfi} e_i$ and in Box 208 the signal is reconstructed by extracting the estimated noise contents as $x_i = y_i - r_i = y_i - D_i^{rfi} e_i$ where the dense noise $w_i$ in equation (5) has been ignored. The steps 203 through 208 are then repeated with the acquisition of new data in another aperture in order to form a complete image. Box 210 represents the image formulation and Box 211 represents the display of the final SAR image. Reference is made to U.S. Patent Application Publication No. 2010/0141508, herein incorporated by reference, for the further information relating to Boxes 210 and 211.

Referring back again in equation (5), the $w_i$ is the system's dense noise with small bounded energy $\|w_i\|_2 \leq \sigma$. The main difference between the two noise sources $w_i$ and $e_i$ is that $e_i$ is sparse and can be captured with only a few significant entries, but each can be large in magnitude, whereas $w_i$ is dense and generally insignificant, in magnitude. This leads to the following optimization problem, which can be solved approximately with orthogonal matching pursuit (OMP):

$$\{\alpha_i', e_i'\} = \underset{\alpha_i, e_i}{\operatorname{argmin}} \{\|\alpha_i\|_0 + \|e_i\|_0\} \quad (8)$$

$$\text{subject to } y_i = [D_i^x \; D_i^{rfi}] \begin{bmatrix} \alpha_i \\ e_i \end{bmatrix} + w_i.$$

It has been well-known in the compressed sensing literature that the following relaxed convex optimization problem can be implemented as an alternative to matching pursuit type algorithms in equation (8) where $\lambda$ and $\tau$ are tuning parameters that control the trade-offs between the sparsity priors and the data consistency constraint $$\{\alpha_i', e_i'\} = \underset{\alpha_i, e_i}{\operatorname{argmin}} \|y_i - D_i^x \alpha_i - D_i^{rfi} e_i\|_2 + \lambda \|\alpha_i\|_1 + \tau \|e_i\|_1. \quad (9)$$

Note that in both formulations of equations (8)-(9), the entries in both dictionaries 104 and 105 should be normalized. Hence, the optimization is not dependent on the noise energy level if the parameters $\lambda$ and $\tau$ are pre-determined appropriately. The resulting noise-suppressed signal can then be computed as $x_i = y_i - D_i^{rfi} e_i$. Each data record that is expected to contain the SAR signal of interest is recovered independently. All are then supplied to the image processor (106) to produce the final SAR image.

Orthogonal Matching Pursuit

A number of recovery techniques in the current Compressed Sensing (CS) literature can be employed to solve the optimization problem in Equation (8). In a preferred embodiment, Orthogonal Matching Pursuit (OMP) was used due to its simplicity, recovery robustness, and fast computation. OMP is also very simple to set up: the only required parameter is the sparsity level K. Once the sparsest coefficient vector $\alpha$ is found, the raw data record is recovered as in Equation (9). All of the recovered data records are then supplied to the back-projection image formation algorithm to produce the final SAR image.

From Wikipedia, the matching pursuit algorithm is described as

---

Algorithm Matching Pursuit
    Input: Signal: f(t), dictionary D.

-continued

```
Output: List of coefficients: (aₙ; gγₙ).
Initialization:
    Rf₁ ← f(t);
    n ← 1;
Repeat:
    find gγₙ ∈ D with maximum inner product⟨Rfₙ, gγₙ⟩;
    aₙ ← ⟨Rfₙ, gγₙ⟩;
    Rfₙ₊₁ ← Rfₙ - aₙgγₙ;
    n ← n + 1;
Until stop condition (for example: ||Rfₙ|| < threshold).
```

An extension of Matching Pursuit (MP) is its orthogonal version: Orthogonal Matching Pursuit (OMP). The main difference with MP is that coefficients are the orthogonal projection of the signal f on the dictionary D. In fact, this algorithm solves the sparse problem:

$$\min_x \|f - Dx\|_2^2 \text{ such that } \|x\|_0 \leq N,$$

with $\|x\|_0$ the $L_0$ pseudo-norm equal to the nonzero elements of x.

Figure 3:
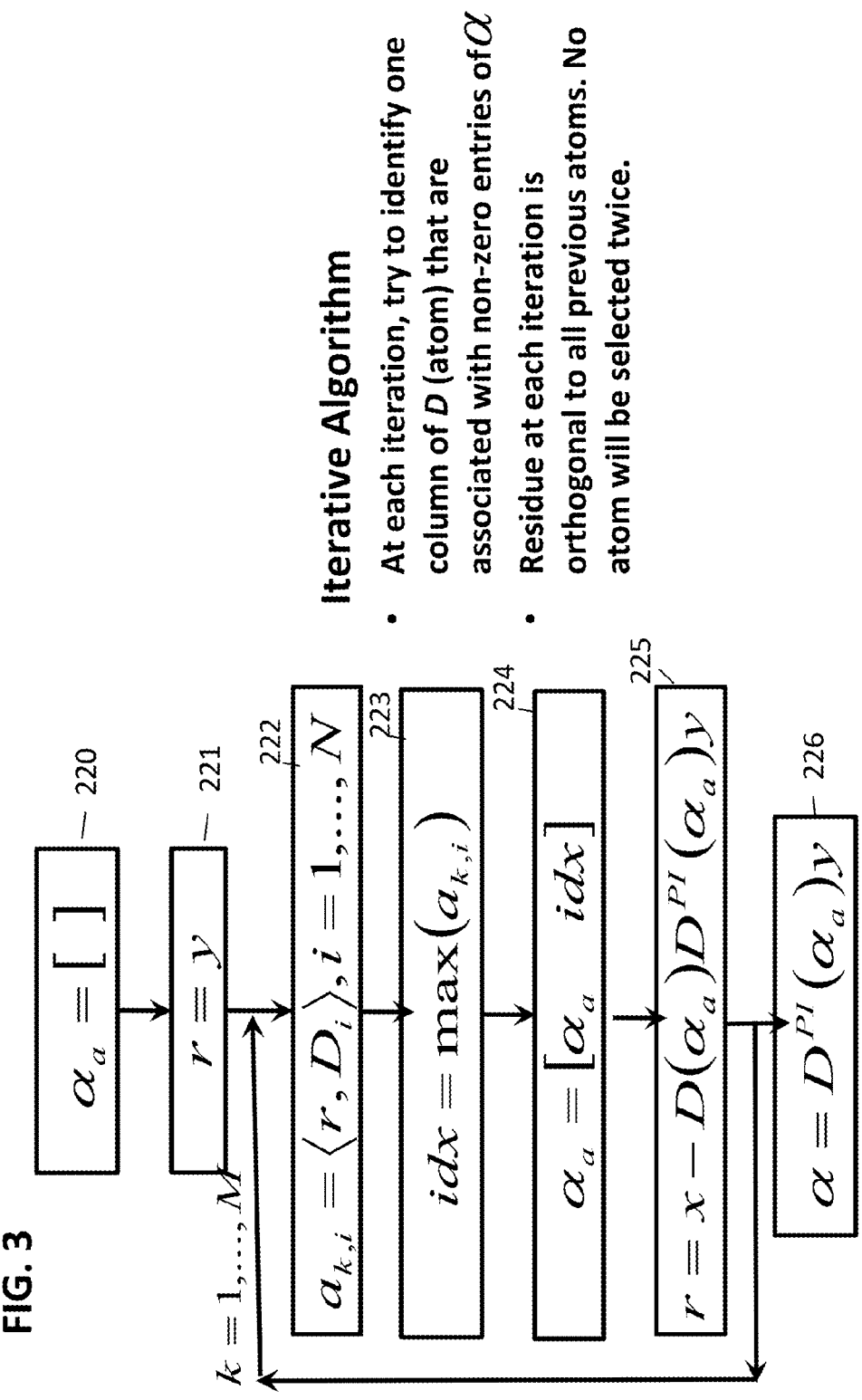
FIG. 3 is a block diagram of a generic orthogonal matching pursuit algorithm.

FIG. 3 is a description of a generic Orthogonal Matching Pursuit Algorithm. In Box 220 α, which represents the coefficients, is initialized. In relation to the preferred embodiment, the coefficients relate to what columns are selected as "best" matches, in Box 221 the parameter r, referred to as the residual, is set initially to y, the incoming received signal. In Box 222, the operation is conducted to find out what is in the dictionary $D_i$ what is the column that most looks like signal being examined. In Box 223, the objective is to try to find the index of columns with the best match between r and the dictionary $D_i$, which is the solution in Box 224, the chosen index or indices are appended to the solution vector. In Box 225, the residue r is updated where $D^{PI}$ the pseudo inverse of the matrix (dictionary) D. The subtrahend represents the pseudo inverse matrix (dictionary) multiplied by the matrix D multiplied by the signal y. The process stops when all indices corresponding to the solution have been determined. If all indices have not been determined, there is a loop back to Box 222; as once one best match is found, the system loops back to find the second best match and so forth. The term $α_a$ represents all indices of columns corresponding to the approximated solution, which is set forth in Box 226.

Experimental Results

Figure 4:
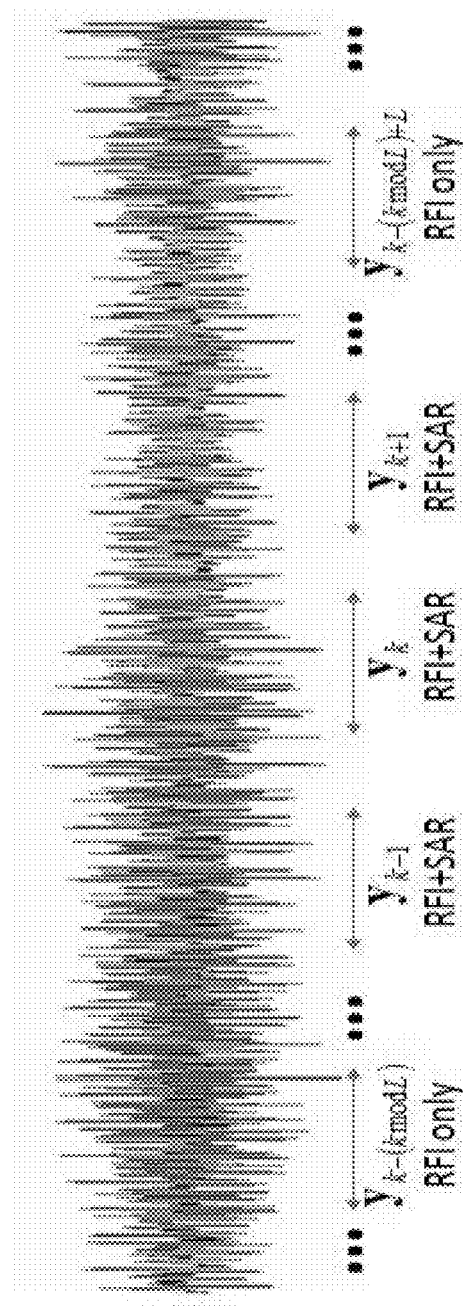
FIG. 4 is an illustration showing the received signal and the noise signal.

The noise extraction technique of the present invention was tested and evaluated using the data from the U.S. Army Research Laboratory (ARL) UWB low-frequency SAR that transmits radar signals occupying the frequency spectrum from 50 to 1150 MHz. Interference noise data were collected from the real environment with the antenna pointing toward Washington. D.C., where a typical example is shown in FIG. 4. For each aperture location i where radar data are collected, the noise record was randomly selected and added to the raw radar data record. The noise-only records used to construct the corresponding noise dictionary were chosen such that the time interval between when the noise records and the radar records are collected are at least 1 ms apart. This delay amount yields a typical radar pulse repetition frequency of 1 kHz.

Figure 5:
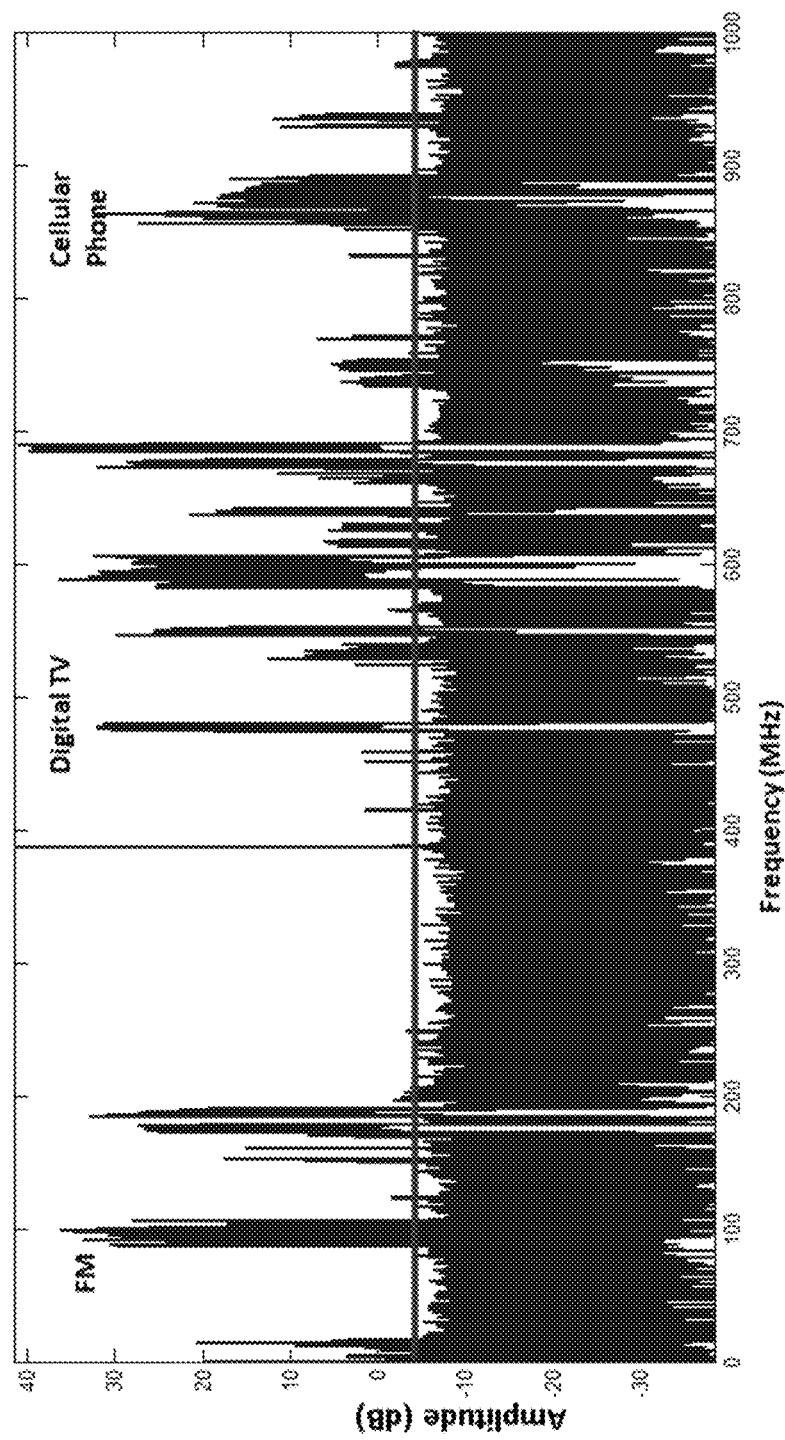
FIG. 5 is an illustration showing a signal frequency spectrum wherein the amplitudes of the signals are shown using a decibel (dB) scale.

FIG. 5 is an illustration of the frequency spectrum showing frequency ranges in which FM, digital TV and cellular phones operate.

Figure 6:
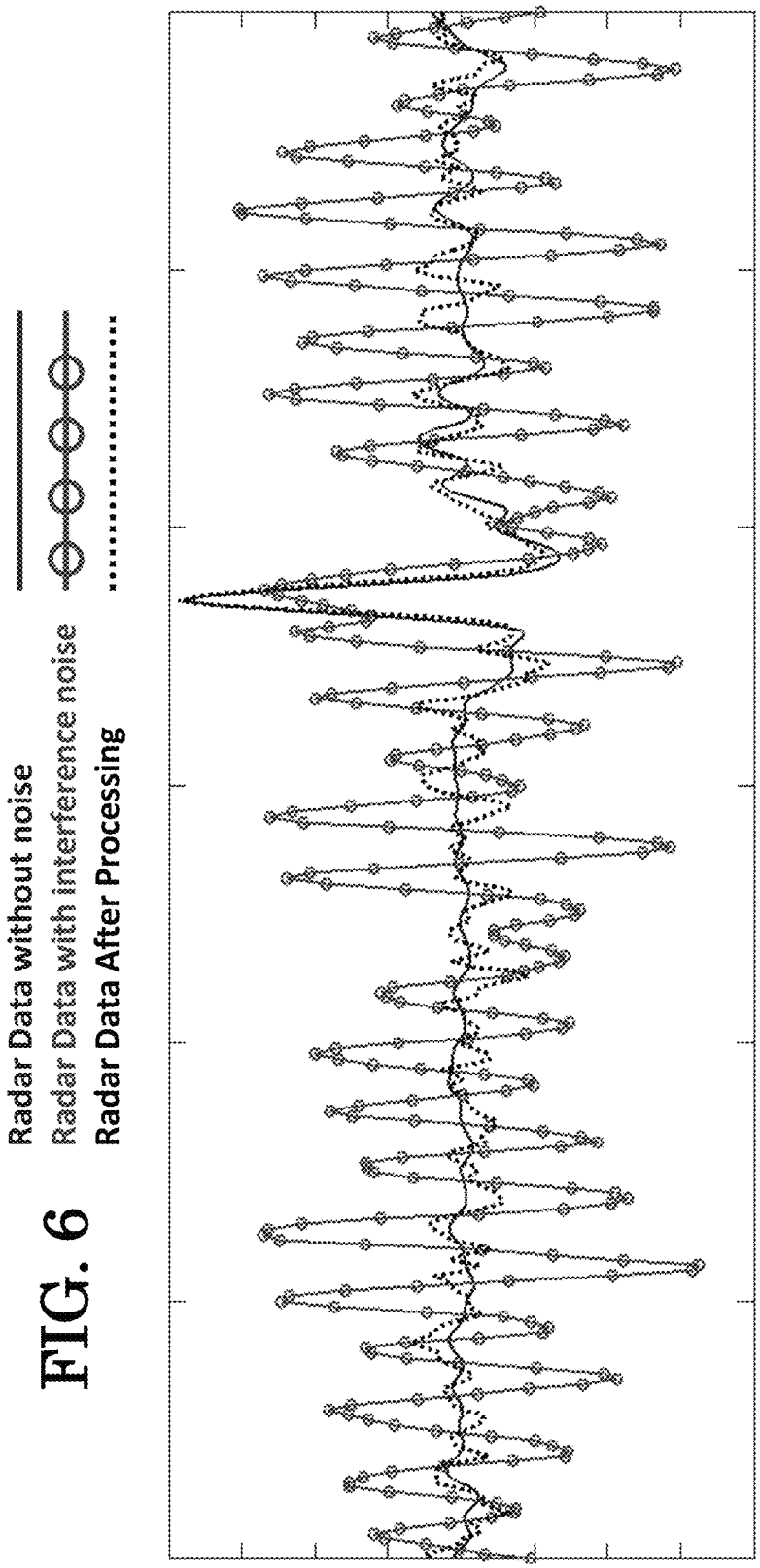
FIG. 6 is an illustration of a comparison of the time-domain plots of a typical original radar record, the corresponding interference noise corrupted version, and the corresponding radio frequency Inference (RFI) extracted version.

FIG. 6 illustrates a comparison of the time-domain plots of a typical original radar record, its interference noise corrupted version, and its RFI extracted version. The interference corrupted version shows that the target responses are completely obscured by the strong interference noise signals. Although a small level of residual noise still remains in the RFI extracted radar record, responses from the targets are essentially recovered and very well matched with the original data.

Figure 7:
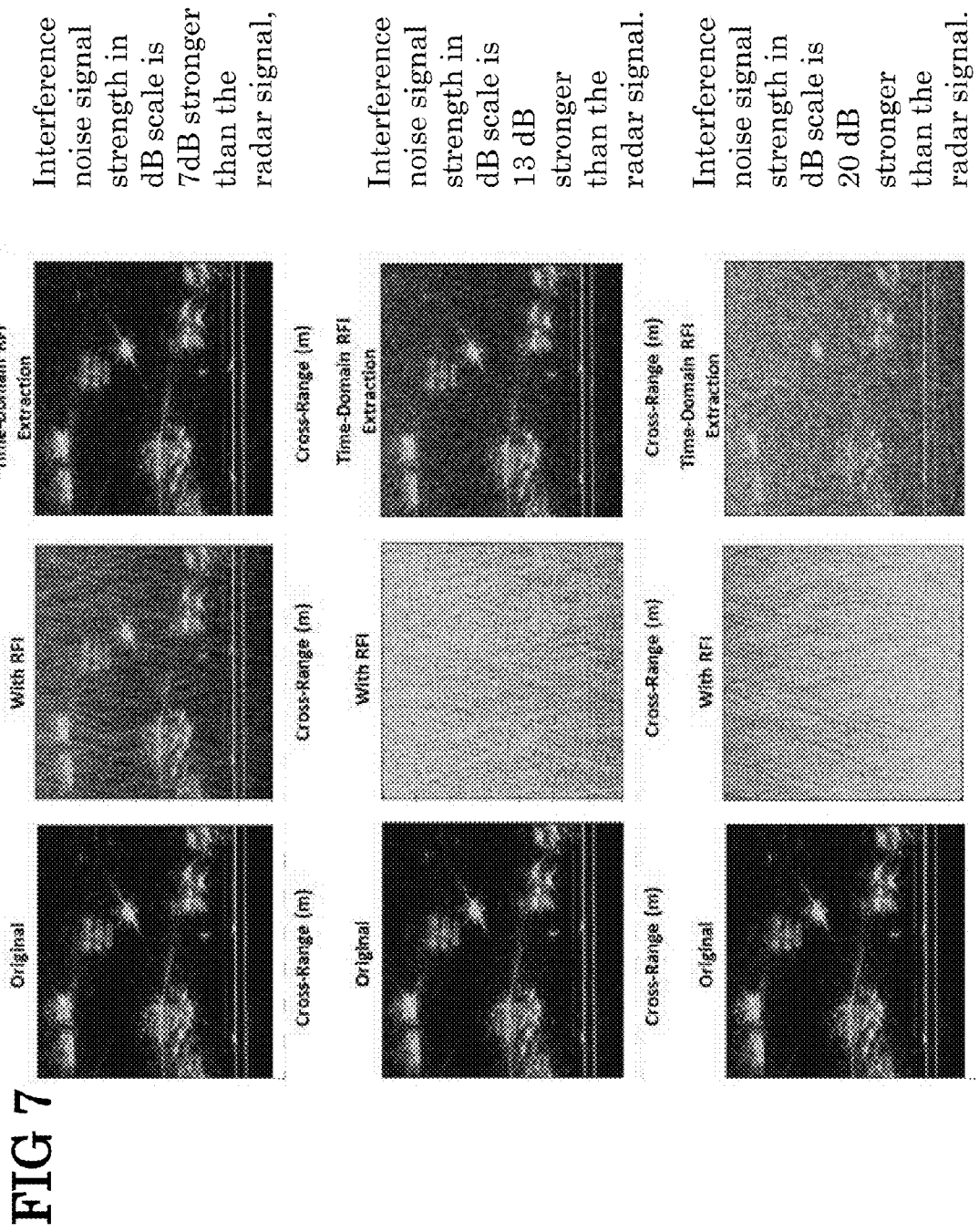
FIG. 7 illustrates a visual depiction of the resulting SAR images after interference noise suppression at various interference levels (where the interference noise signal strength in dB scale is 7, 13, and 20 dB stronger than the radar signal, respectively, when measured in the raw data domain) wherein (a) in the left column are images of the original side-looking SAR images formed using data from the ARL radar without any interference; (b) in the middle column are SAR images farmed using radar data contaminated with noise signals without any processing and (c) in the right column are the resulting SAR images after the proposed RFI extraction technique has been applied to the contaminated radar data.

FIG. 7 illustrates a visual depiction of the resulting SAR images after interference noise suppression at various interference levels (where the interference noise signal strength in dB scale is 7, 13, and 20 dB stronger than the radar signal, respectively, when measured in the raw data domain). The figures in the left column of FIG. 7 show the original side-looking SAR images formed using data from the ARL radar without any interference. This SAR image shows a few targets (vehicles) hiding behind foliage and tree area. The figures in the middle column depict the SAR images formed using radar data contaminated with noise signals without any processing. Finally, the figures in the right column of FIG. 7 illustrate the resulting SAR images after the proposed RFI extraction technique has been applied to the contaminated radar data.

Figure 8:
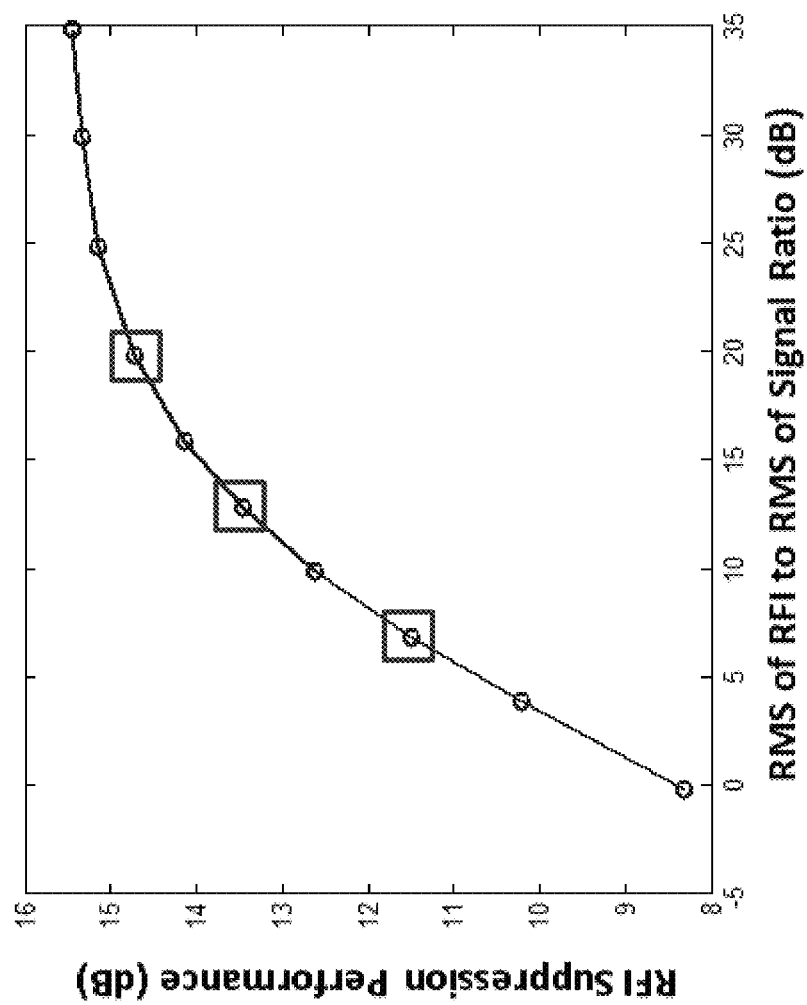
FIG. 8 illustrates a graph where the three data points associated with FIG. 7 appear in square boxes and an average of more than 10 dB of RFI energy level is consistently suppressed after the image formation stage (i.e., a signal-to-noise ratio (SNR) is measured in the SAR image domain).

For the three cases shown in FIG. 7, the level of RFI suppression (which is different than the strength of the noise interference) turns out to be 11.3, 13.5, and 14.7 dB, respectively. In all cases, as illustrated in the follow-up FIG. 8 (where the three data points associated with FIG. 7 are in square boxes), an average of more than 10 dB of RFI energy level is consistently suppressed after the image formation stage (i.e., a signal-to-noise ratio (SNR) is measured in the SAR image domain). When the noise level increases, the suppression level can get up to 15 dB and levels off at around 15.5 dB. In addition to radar, the invented noise extraction technique works with any communications systems that suffer from interference noise. Examples of such practical systems and applications include: radars operating in combative environments with frequent enemy jamming; audio recordings with background noise; noise-cancellation headphones in noisy environments such as airplanes, airports, construction sites, etc.

The practical applications of the invention in relation to radar include wide area mapping, surveillance, target detection and discrimination, concealed target detection, through-the-wall building mapping, tunnel detection, ground penetration radar, collision and obstacle, imaging, radar. Also, the present invention may be used for radar jamming avoidance (the noise being the jamming signal). The present invention may be used with high speed data links and networks. Another practical application is usage in noise cancelling systems such as headphones, car and recording technology.

An advantage of the preferred embodiment described, is that it is adaptive with the changing environment. It does not assume any knowledge (amplitude, frequency band, modulation scheme, number of noise sources, etc.) of the interference sources. A preferred embodiment technique directly estimates and subtracts interference noise signals from the radar signals in the time domain. Therefore, it does not suffer from: 1) high sidelobes, and 2) reduced target-amplitude effects as in existing notch-filtering approaches. The preferred embodiment technique simultaneously solves for (i) the radar signals embedded in interference noise with large amplitudes and (ii) the interference noise signals within one unified sparsity-driven optimization framework. Such techniques operate in the low-frequency spectrum that spans from under 100 MHz to several GHz in order to penetrate foliage, walls, etc. and employ wide-bandwidth signals to achieve the desired resolution. Other approaches, such as notched filters result in (i) large sidelobes in the time domain of the received signal and (ii) reduced target amplitudes. In addition to radar, the invented noise extraction technique works with any communications systems that suffer from interference noise.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein may comprise hardware and software embodiments. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system for apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output (I/O) devices (including but not limited to receivers, etc.) can be coupled to the system either directly or through interverting I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The Compressed Sensing theory asserts that under several mild conditions of the matrix $S_N$, the above $l_0$-norm minimization problem ($L_0$-norm is simply its number of significant (non-zero) elements) can be efficiently solved by recasting it as the following $l_1$-norm convex optimization:

$$a^* = \min |a|_1 s.t. x_N = S_N a,$$

and the original signal can be recovered as $x^* = S_N a^*$.

All of the recovered data records are then supplied to the time-domain projection image formation algorithm to produce the final SAR image.

There are various techniques for solving the inverse linear system of equations for the sparsest a* in the compressed sensing community, which can be classified into two categories:

BASIS PURSUIT via linear programming (as described in E. Candès and T. Tao, "Decoding by linear programming," IEEE Trans. on Information Theory, vol. 51, no. 12, pp. 4203-4215 (December 2005)(hereby incorporated by reference) or gradient projection (as described in M. A. T. Figueiredo, R. D. Nowak, and S. J. Wright. "Gradient projection for sparse reconstruction: Application to compressed sensing and other inverse problems," IEEE Journal of Selected Topics in Signal Processing: Special Issue on Convex Optimization Methods for Signal Processing, vol. 1, no. 4, pp. 586-598 (April 2007) (hereby incorporated by reference);

MATCHING PURSUIT via orthogonal matching pursuit (as described in J. Tropp and A. Gilbert, "Signal recovery from random measurements via orthogonal matching pursuit," IEEE Trans. on Information Theory, vol. 53, no. 12, pp. 4655-4666 (December 2007)(hereby incorporated by reference)) regularized orthogonal matching pursuit as described in D. Needell and R. Vershynin, "Signal recovery from incomplete and inaccurate measurements via regularized orthogonal matching pursuit," IEEE journal of Selected Topics in Signal Processing, vol. 4, pp. 310-316 (April 2010) (hereby incorporated by reference)), subspace pursuit (as described further in W. Dai and O. Milenkovic, "Subspace pursuit for compressive sensing: Closing the gap between performance and complexity," IEEE Trans. on Information Theory, vol. 55, pp. 2230-2249 (May 2009) (hereby incorporated by reference)), sparsity adaptive matching pursuit (as described further in T. T. Do, L. Gan, N. H. Nguyen, and T. D. Tran, "Sparsity adaptive matching pursuit algorithm for practical compressed sensing" in Proc. Asilomar Conf. on Signals, Systems, and Computers, pp. 581-587, Pacific Grove (October 2008)(hereby incorporated by reference), etc.

In this implementation the orthogonal matching pursuit technique may be employed as described in J. Tropp and A. Gilbert, "Signal recovery from random measurements via orthogonal matching pursuit," IEEE Trans, on Information Theory, vol. 53, no. 12, pp. 4655-4666 (December 2007)

(hereby incorporated by reference) to solve for a* due to its simplicity, recovery robustness, and fast computation. This algorithm is graphically illustrated in FIG. 3.

Dictionary of Shifted Versions of Transmit Waveform as Sparsifying Matrix

In the vector space $C^N$ of N-dimensional signals, vector x can be represented as x=ψa, where ψ is called the sparsifying matrix which in other words, the representation through ψ can be (and in many cases, should be) close to the original signal x. The sparsifying matrix is said to be complete if its columns span the entire N-dimensional space. The signal x is said to be strictly K-sparse when there are only K non-zero components in a. When the sorted magnitudes of $(a_i)$ decay very quickly and x can be well approximated with only K components, then x is said to be K-compressible. The effectiveness of the recovery algorithm of a class of signal x heavily depends on the sparsest representation of the signal class.

In standard compressed sensing, fixed linear transform bases such as the DCT, FFT and the discrete wavelet transform (DWT) or a combination of all three are often employed to obtain sparsity. In the UWB SAR system, the transmitted pulse is a monocycle impulse with an approximated bandwidth range of 300-3000 MHz. Current collected raw data captured in the 8 receivers do not exhibit any common sparse pattern. In other words, a quick spectrum analysis reveals that the raw data is not time-sparse or frequency sparse or even wavelet sparse. Hence, a naïve direct application of Compressed Sensing (CS) via random projection with Fourier, cosine, or wavelet bases yields disappointing results.

As used herein "processor" may include but is not limited to a computer, central processing unit (CPU), microprocessor, multiprocessor, main frame computer, personal computer, or laptop computer.

As used herein the terminology "matching pursuit" means a technique for finding the "best matching" projections of multidimensional data onto an over-complete dictionary. As stated in Wikipedia, the basic idea is to represent a signal from Hilbert space as a weighted sum of functions (called atoms) taken from called atoms) taken from D:

$$f(t) = \sum_{n=0}^{+\infty} a_n g_{\gamma_n}(t)$$

where indexes the atoms that have been chosen, and a weighting factor (an amplitude) for each atom. Given a fixed dictionary, matching pursuit will first find the one atom that has the biggest inner product with the signal, then subtract the contribution due to that atom, and repeat the process until the signal is satisfactorily decomposed. By taking an extremely redundant dictionary one can look in it for functions that best match a signal. Finding a representation where most of the coefficients in the sum are close to 0 (sparse representation) is desirable for signal coding and compression.

As used herein, the terminology "sparsity driven" of "sparsity-driven" is a relative term relating to the finding of a compressible solution which is intended to be treated broadly. For example, a sparse matrix is a matrix with enough zeros that it pays to take advantage of them; commonly interpreted from an economics view point in that if one can save time and memory by exploiting the zeros, then a matrix is sparse. The terminology sparsity refers to the selection of a model, within a hierarchy of model classes, that yields a compact representation; i.e. a model that depends on only a few of the observations, selecting a small subset of features for classification or visualization. Selection of an optimal representation which is sufficiently sparse enables efficient computation by optimization techniques and alleviates the extreme difficulty encountered without sufficient sparsity.

As used herein, the terminology "target" area means area of interest, which may be, for example, a scene, an animal or human body or portion thereof, face (as in face recognition), object, ground region, field, landscape, aerial environment, or a combination thereof.

The term "noise" as used herein relates to observation noise. There are many sources that cause noise in the resulting observed signal. Noise can be divided into two categories: additive noise and multiplicative noise. System noise, thermal noise, quantization noise, self-interference noise, radio frequency interference (RFI) noise are some examples of the additive noise. Multiplicative noise is much more difficult to deal with since it is data dependent. Some sources that cause multiplicative noise include: timing jitter in data sampling, small aperture size compared to image area, the under-sampling of aperture samples, the non-uniform spacing between aperture samples, errors in position measurement system, etc. Multiplicative noise results in undesired sidelobes that create high noise floor in the image and thus limit the ability to detect targets.

As used herein, the terminology "dictionary" means an organized listing of data stored in machine-readable form for reference. The dictionary may be located in any type of storage or memory for storage of data. As an example, the "dictionary" may comprise time shifted versions of the transmitted probing signal s(t).

As used herein the terminology "spectral" means of or relating to a spectrum. The terminology "spectrum" refers to a band, portion or region of the electromagnetic spectrum which may or may not be continuous, for example, the radio spectrum is the region of the electromagnetic spectrum spanning the radio frequency range. The terminology "spectra" is the plural of spectrum.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for reception of electromagnetic waves in spectrum in which interference with radio frequencies of other electronics devices occurs comprising:
   at least one transmitter for transmitting first electromagnetic radiation at a wide range of frequencies, including frequencies in which RF devices transmit;
   at least one receiver for receiving the received signal comprising the first electromagnetic radiation and radio frequency interfering signal data;
   a first memory portion for storing data relating to the transmitted signal waveforms;
   a second memory portion for storing radio frequency interfering signal data;

a switch for periodically allowing the radio frequency interfering signal data to enter the second memory portion from the receiver;

at least one processor operatively connected to the receiver, the first memory portion and the second memory portion, the at least one processor operating to process the received signal containing radio frequency interfering signal data and first electromagnetic radiation by matching the received signal against data relating to the transmitted signal waveforms from the first memory portion and radio frequency interfering signal data from the second memory portion, the at least one processor operating to compare the received signal to the radio frequency interfering signal data from the second memory portion and extract the portion of the received signal attributable to the radio frequency interfering signal data.

2. The system of claim 1 wherein the first and second memory portions comprise first and second dictionaries and wherein the switch for periodically allowing the radio frequency interfering signal data to enter the second dictionary comprises software which incrementally sends the radio frequency interfering signal data into the second dictionary while the transmitter is not transmitting.

3. The system of claim 1 wherein the switch for periodically allowing the radio frequency interfering signal data to enter the second dictionary comprises a hardware switch that incrementally sends the radio frequency interfering signal data into the second memory portion while the transmitter is not transmitting.

4. The system of claim 1 wherein the first memory portion is constructed using time independent transmitted signal waveforms which correspond to received signals reflected back from objects in the scene of interest located at specific distances, and wherein the processor operates to match the receive data with a stored transmitted signal waveforms to determine the distance of the target or targets.

5. The system of claim 4 wherein the second memory portion comprises rows and columns for storage of data, and wherein the second memory portion comprises radio frequency interfering signal data received at intervals in time during which no signal is transmitted; the radio frequency interfering signal data being broken into segments using a sliding window mechanism to store different segments into different columns of the second memory portion, the at least one processor operating to compare the received signals to the match the received signals with the best matches from each of the first and second dictionaries.

6. The system of claim 1 wherein the first and second memory portions comprise rows and columns for storage of data, the at least one processor forms a combined memory portion from the first and second memory portions, and the at least one processor operating to correlate the received signal to the entries in the combined memory portion to find the best matching columns, the at least one processor operating to select the best matching columns associated with second memory portion to estimate the radio frequency interfering signal data in the received signal, the at least one processor operating to extract the estimated radio frequency interfering signal data from the received signal to generate an improved radar signal.

7. The system of claim 6 wherein the first and second memory portions are first and second dictionaries having the same number of columns.

8. The system of claim 6 wherein each column in the first memory portion comprises a vector that has a length n elements in a column that corresponds to the range swath of the radar and wherein columns range in time and distance such that each column represents a target at a different distance.

9. The system of claim 6 wherein to find the best matching columns in the combined memory portion the L1 norm is determined using the equation $$\{\alpha'_i, e'_i\} = \operatorname*{argmin}_{\alpha_i, \varepsilon_i} \left\| y_i - D_i^x \alpha_i - D_i^{rfi} e_i \right\|_2 + \lambda \|\alpha_i\|_1 + \tau \|e_i\|_1.$$

where y is the sparse signal, r is the radio frequency interfering signal data, $w_i$ is a dense noise source and generally insignificant in magnitude, $e_i$ is the sparse noise source and can be captured with only a few significant entries, but each can be large in magnitude, $\alpha_i$ represents the coefficients of the indices of signal data, $D_i^x$ represents the first dictionary and $D_i^{rfi}$ represents the second dictionary, $\lambda$ and $\Sigma$ represent constants.

10. The system of claim 9 wherein the radio frequency interfering signal data is subtracted out by performing an $L_1$ norm.

11. The system of claim 6 wherein to find the best matching columns in the combined memory portion the L0 norm is determined using the equation $$\{\alpha'_i, e'_i\} = \operatorname*{argmin}_{\alpha_i, e_i} \{\|\alpha_i\|_0 + \|e_i\|_0\}$$

$$\text{s.t.} \quad y_i = [D_i^x \ D_i^{rfi}] \begin{bmatrix} \alpha_i \\ e_i \end{bmatrix} + w_i$$

where y is the sparse signal, $w_i$ is a dense noise source and generally insignificant in magnitude, $e_i$ is the sparse noise source, $\alpha_i$ represents the coefficients of the indices of signal data, $D_i^x$ represents the first memory portion and $D_i^{rfi}$ represents the second memory portion.

12. The system of claim 11 wherein columns in the first and second memory portions have same dimensions, each column having a length n, and wherein each column in the second memory portion represents radio frequency interfering signal data taken at a different time.

13. The system of claim 12 wherein the number of columns in second memory portion correlate to radio frequency interfering signal data shifted in time and wherein by taking the L0 norm, the received signal is matched with radio frequency interfering signal data shifted in time.

14. The system of claim 1 wherein the at least one processor operates on signal data which may be represented by $y_i = x_i + r_i + w_i = D_i^x \alpha_i + D_i^{rfi} e_i + w_i$, where y is the sparse signal, $r_i$ is the radio frequency interfering signal data, $w_i$ is a dense noise source and generally insignificant in magnitude, $e_i$ is the sparse noise source and can be captured with only a few significant entries, but each can be large in magnitude, $\alpha_i$ represents the coefficients of the indices of signal data, $D_i^x$ represents the first memory portion and $D_i^{rfi}$ represents the second memory portion.

15. The system of claim 1 wherein a composite image is formed from the received signal using one of orthogonal matching pursuit, basis pursuit, gradient projection, matching pursuit, orthogonal matching pursuit, regularized matching pursuit or subspace pursuit.

16. A method for reception of electromagnetic waves in spectrum in which interference with radio frequencies of other electronics devices occurs comprising:

transmitting first electromagnetic radiation into a target area at a wide range of frequencies, including frequencies in which RF devices transmit;

using a receiver, receiving the received signal comprising the transmitted first electromagnetic radiation and radio frequency interfering signal data;

providing a first memory portion for storing data relating to the transmitted signal waveforms;

providing a second memory portion for storing radio frequency interfering signal data;

providing a switch for periodically allowing the radio frequency interfering signal data to enter the second memory portion from the receiver;

providing at least one processor operatively connected to the receiver, the first memory portion and the second memory portion, using the at least one processor, processing the received signal from the target area containing radio frequency interfering signal data and target image data by matching the received signal against data relating to the transmitted signal waveforms from the first memory portion and radio frequency interfering signal data from the second memory portion, using the at least one processor, comparing the received signal to the radio frequency interfering signal data from the second memory portion and extracting the portion of the received signal attributable to the radio frequency interfering signal data to obtain the transmitted first electromagnetic radiation.

17. The method of claim 16 wherein the transmitted first electromagnetic radiation is radar, radio, television or a communication system signal.

* * * * *